(12) United States Patent
McCann et al.

(10) Patent No.: US 7,290,821 B1
(45) Date of Patent: Nov. 6, 2007

(54) TAILGATE SEATBACK AND ACCESSORY HOLDING SYSTEM

(76) Inventors: Monty D. McCann, 300 E. Meyer St., Falls City, TX (US) 78113; Michael G. Blanquiz, 300 E. Meyer St., Falls City, TX (US) 78113

( * ) Notice: Subject to any disclaimer, the term of this patent is extended or adjusted under 35 U.S.C. 154(b) by 130 days.

(21) Appl. No.: 11/186,102

(22) Filed: Jul. 22, 2005

(51) Int. Cl.
*B60R 9/00* (2006.01)

(52) U.S. Cl. .......................... 296/40; 296/64; 296/102; 224/404; 224/922; 224/913

(58) Field of Classification Search ................... 296/64, 296/102, 57.1, 63, 65.01, 40; 224/404, 922, 224/913
See application file for complete search history.

(56) References Cited

U.S. PATENT DOCUMENTS

| | | | |
|---|---|---|---|
| 4,343,578 A * | 8/1982 | Barnes ........................ 410/151 |
| D292,950 S | 12/1987 | Fry et al. |
| 4,779,831 A * | 10/1988 | Anderson ................ 248/311.2 |
| 5,000,504 A | 3/1991 | Munguia |
| 5,044,109 A * | 9/1991 | Fast ............................ 43/21.2 |
| 5,215,346 A | 6/1993 | Reitzloff et al. |
| 5,533,774 A | 7/1996 | Cavanaugh |
| 5,971,464 A | 10/1999 | Davis et al. |
| 6,098,860 A * | 8/2000 | Phillips ...................... 224/483 |
| 6,116,676 A | 9/2000 | Edwards |
| 6,631,938 B1 | 10/2003 | Burns |

* cited by examiner

*Primary Examiner*—Dennis Pedder
*Assistant Examiner*—Melissa Black (57) ABSTRACT

A tailgate seatback and accessory holding system includes an elongated member that has a first end and a second end. Each of the first and second ends has a slot extending therein. The slots are each configured to releasably receive one of a pair of locking members attached to opposite side walls of a pickup bed. The locking members are positioned in the slots so that the elongated member extends between the side walls of a pickup bed.

20 Claims, 9 Drawing Sheets

//</br>
TAILGATE SEATBACK AND ACCESSORY HOLDING SYSTEM

BACKGROUND OF THE INVENTION

1. Field of the Invention

The present invention relates to tailgate seatback devices and more particularly pertains to a new tailgate seatback device for providing a backrest for a person sitting on a pickup truck tailgate and which may also be used as a support for holding various items.

2. Description of the Prior Art

The use of tailgate seatback devices is known in the prior art. U.S. Pat. No. 5,971,464 describes a device that can be extended between the side walls of a pickup truck and as such function as a backrest for a person sitting on the tailgate of the pickup truck. Another type of tailgate seatback device is U.S. Pat. No. 5,000,504 having a complete seat construction attachable to a truck tailgate. Another type of seat device for pickup trucks is found in U.S. Pat. No. 5,533,774 that includes a plurality of seat that are hingedly coupled to an outer surface of a pickup truck and which can be folded into the outer surface of the pickup truck when not in use.

While these devices fulfill their respective, particular objectives and requirements, the need remains for a system that provides a seatback for a person sitting on a tailgate of a pickup truck but which also includes a plurality of holding members which can be attached to the seatback to provide support and storage for a plurality of items. The items may include guns, beverage cans, drinking cups, fishing rods and the like. The system will make the usage of a pickup truck more convenient and better utilized to its owner.

SUMMARY OF THE INVENTION

The present invention meets the needs presented above by generally comprising an elongated member that has a first end and a second end. Each of the first and second ends has a slot extending therein. The slots are each configured to releasably receive one of a pair of locking members attached to opposite side walls of a pickup bed. The locking members are positioned in the slots so that the elongated member extends between the side walls of a pickup bed.

The present invention also meets the needs presented above by generally comprising an elongated member that has a first end and a second end. Each of the first and second ends has a slot extending therein. The slots are each configured to releasably receive one of a pair of locking members attached to opposite side walls of a pickup bed. A plurality of detachable holders is provided. Each of the detachable holders is releasably attachable to the elongated member and is configured to releasably secure a selected item to the elongated member. The locking members are positioned in the slots so that the elongated member extends between the side walls of a pickup bed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 13 thereof, a new tailgate seatback device embodying the principles and concepts of the present invention and generally designated by the reference numeral 10 will be described.

As best illustrated in FIGS. 1 through 13, the tailgate seatback and accessory holding system 10 generally comprises an elongated member 12 that has a first end 14 and a second end 16. The elongated member 12 is telescoping and includes a first portion 18 that is removably extendable into a second portion 20. The first portion 18 includes the first end 14 and the second portion 20 includes the second end 16. Each of the first 14 and second 16 ends has a slot 22 extending therein. Each of the slots 22 is configured to releasably receive one of a pair of locking members 24 attached to opposite side walls 26 of a pickup bed 28. The locking members 24 are typically locking pins.

The elongated member 12 has a generally rectangular shaped cross-section taken perpendicular to a longitudinal axis of the elongated member 12. The elongated member 12 has an upper edge 30, a lower edge 32, a front side 34 and a back side 36. The upper edge 30 has a pair of wells 38 extending therein. The wells 38 are spaced from each other. A first of the wells 38 is positioned in the first portion 18 and is located adjacent to the first end 14. A second of the wells 38 is positioned in the second portion 20 and is located adjacent to the second end 16. The wells 38 preferably have a non-circular shape.

A plurality of detachable holders 40 is provided. Each of the detachable holders 40 is releasably attachable to the elongated member 12 and each is configured to releasably secure a selected item to the elongated member 40. Each of the detachable holders 40 includes a bracket 42 that is removably positionable on the elongated member 12. The brackets 42 each include a U-shaped member that has a pair of free ends 44. Each of the free ends 44 has a flange 46 attached thereto. The flanges 46 on each of the brackets 42 generally extend toward each other. The brackets 42 are positioned on the elongated member 42 so that a central member 48 of the bracket 42 is positioned adjacent to the front side 34 and arms 50 of the bracket 42 extend across one of the top 30 and lower 32 edges. Each of a plurality of grips 52 is attached to one of the flanges 46. The brackets 42 are each comprised of a resiliently elastic material.

Figure 1:
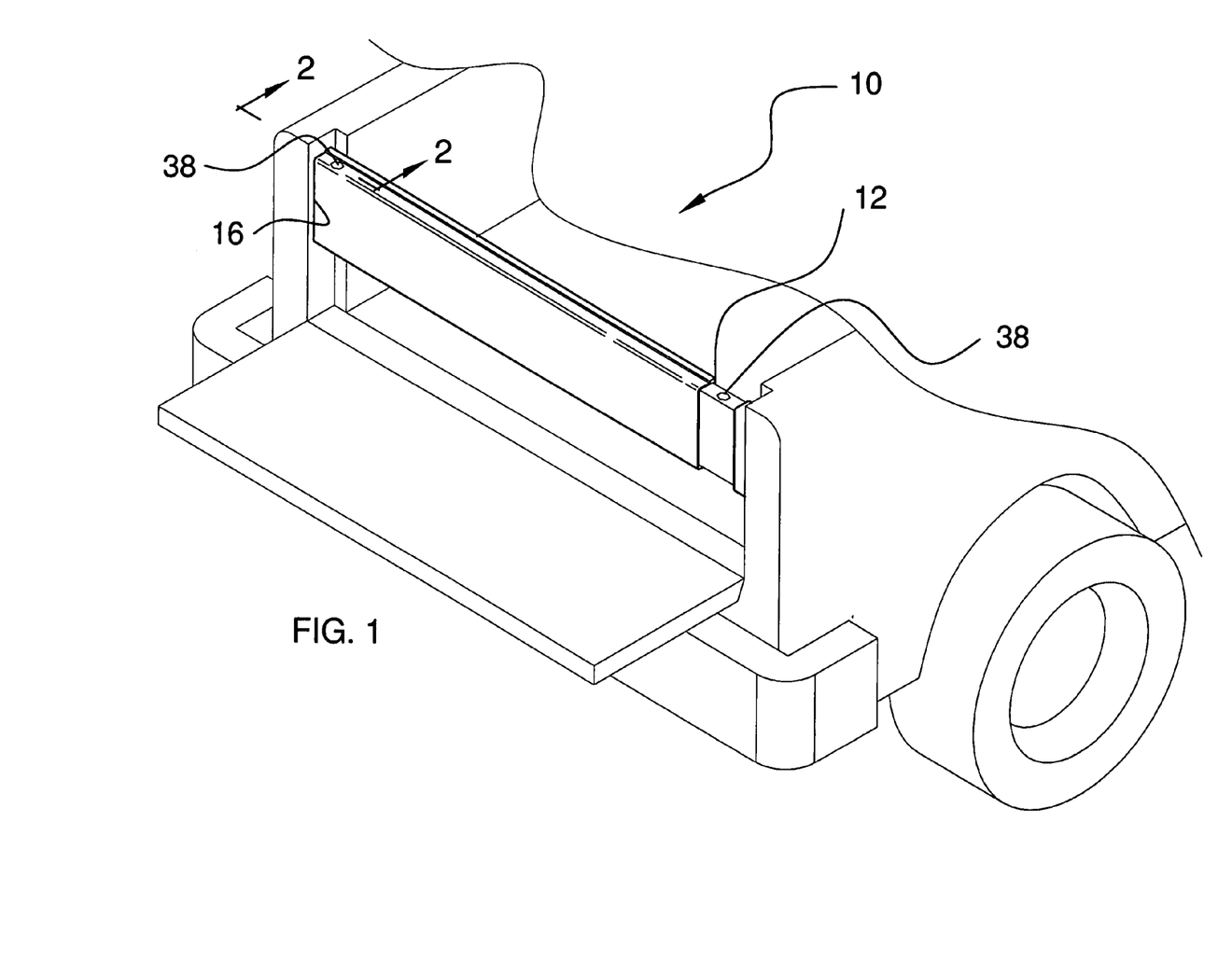
FIG. 1 is a perspective in-use view of a tailgate seatback and accessory holding system according to the present invention.
Figures 2, 3:
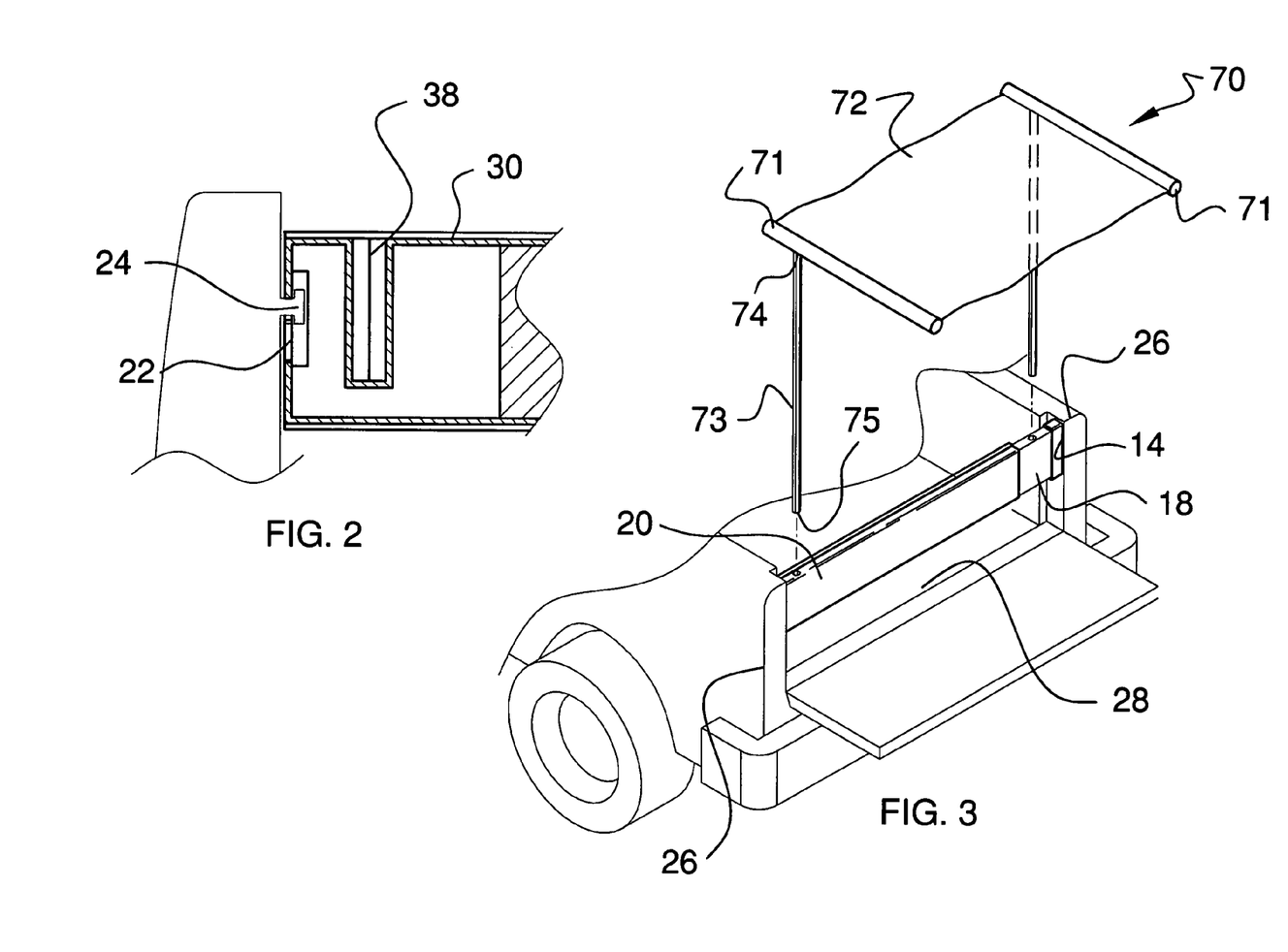
FIG. 2 is a cross-sectional view taken along line 2-2 of FIG. 1 of the present invention.
FIG. 3 is a perspective in-use view of the present invention.
Figure 4:
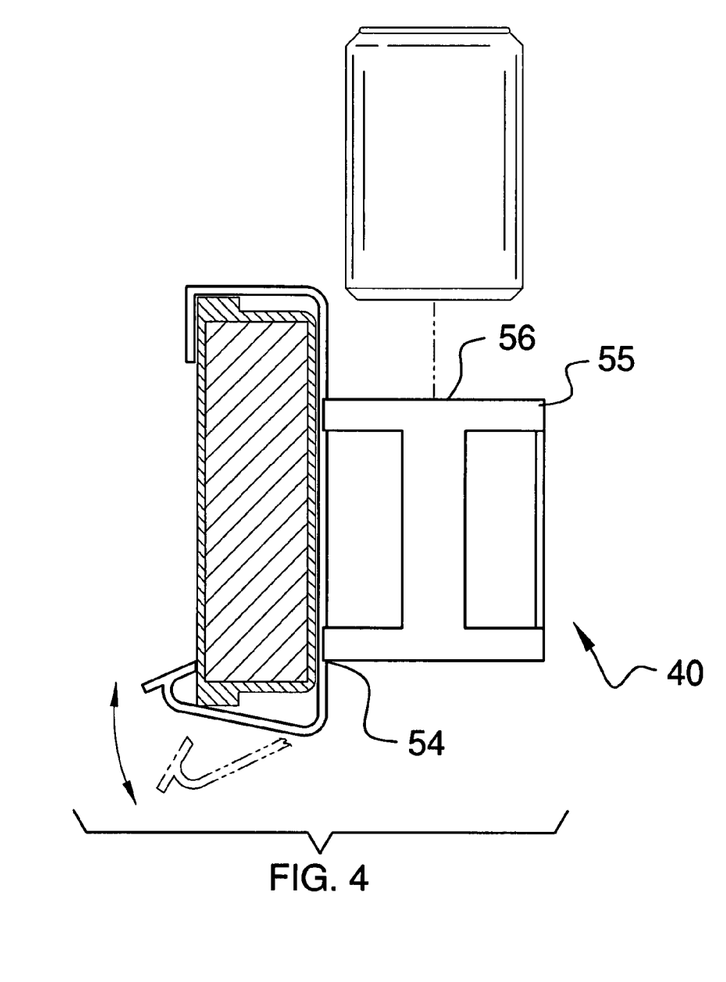
FIG. 4 is a side view of a can holder of the present invention.
Figure 5:
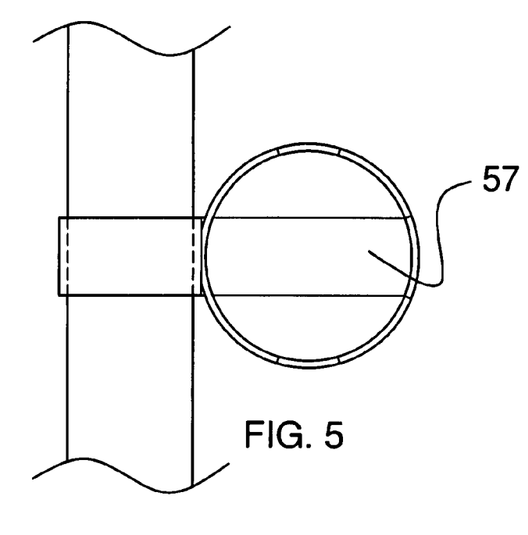
FIG. 5 is a top view of the can holder of the present invention.
Figures 6, 7:
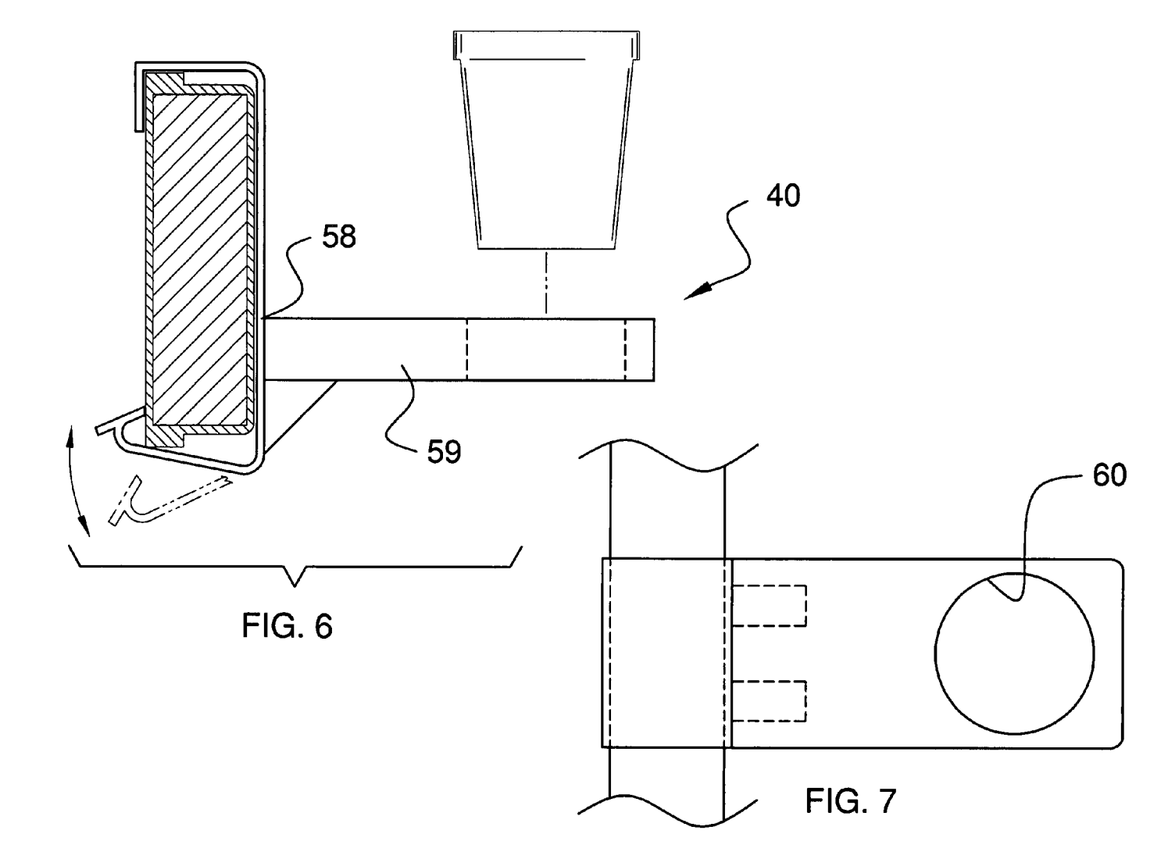
FIG. 6 is a side view of a cup holder of the present invention.
FIG. 7 is a top view of the cup holder of the present invention.
Figure 8:
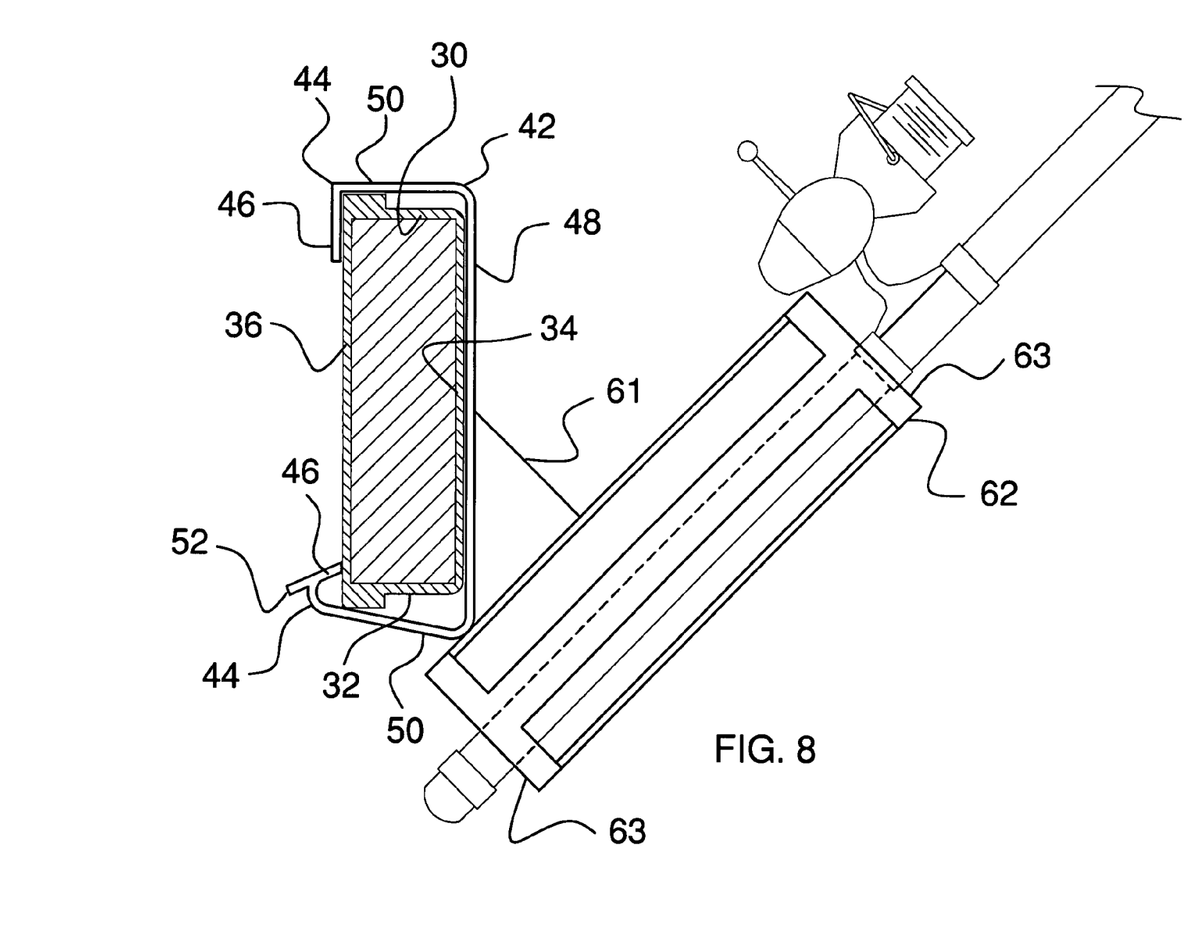
FIG. 8 is a side view of a fishing rod holder of the present invention.
Figure 9:
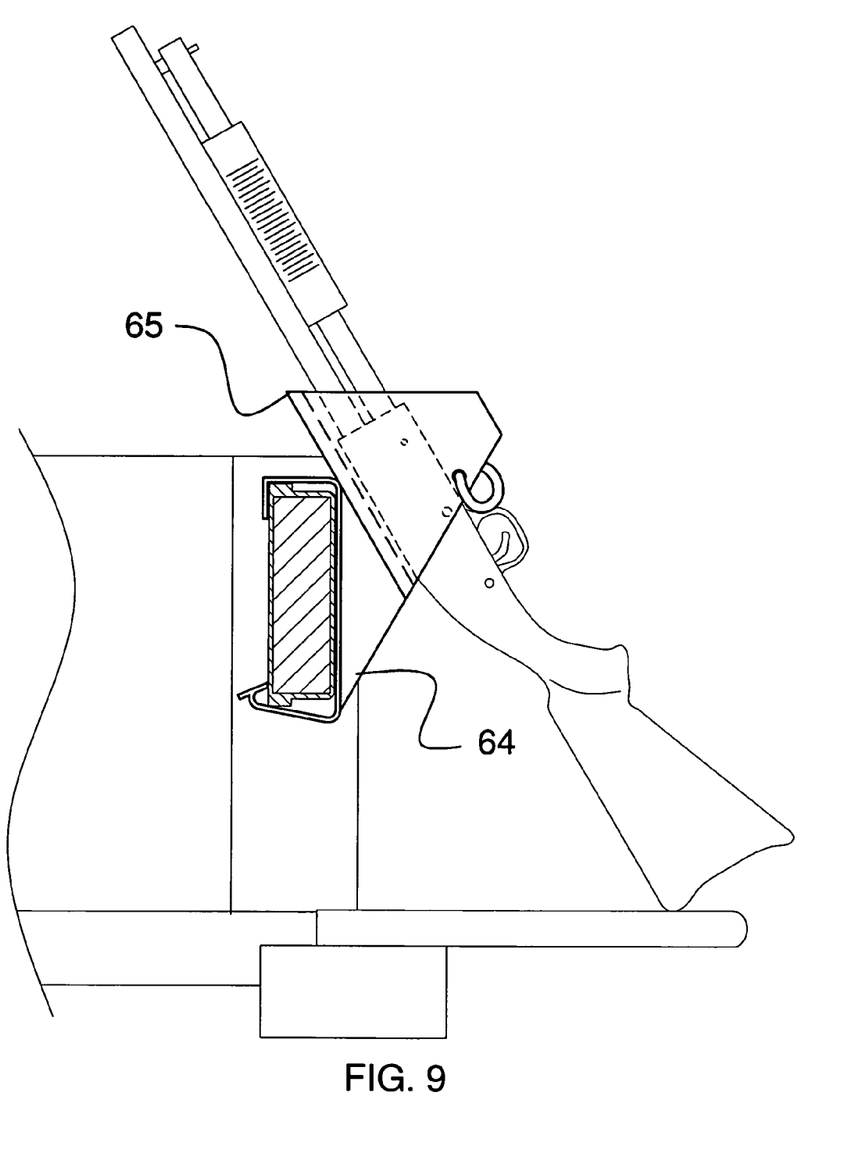
FIG. 9 is a side view of a gun holder of the present invention.
Figure 10:
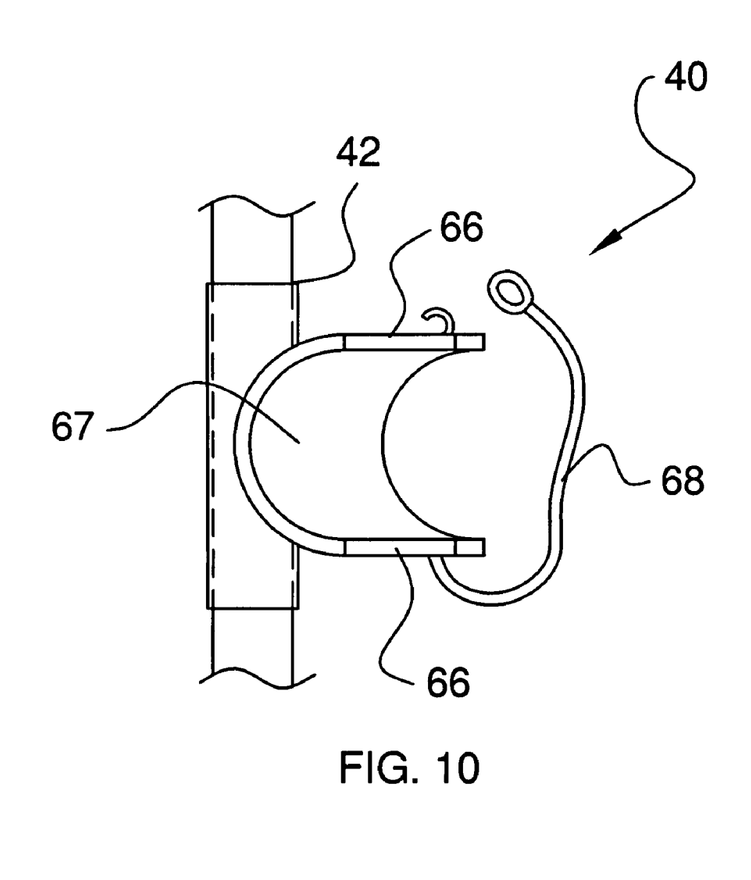
FIG. 10 is a top view of the gun holder of the present invention.
Figure 11:
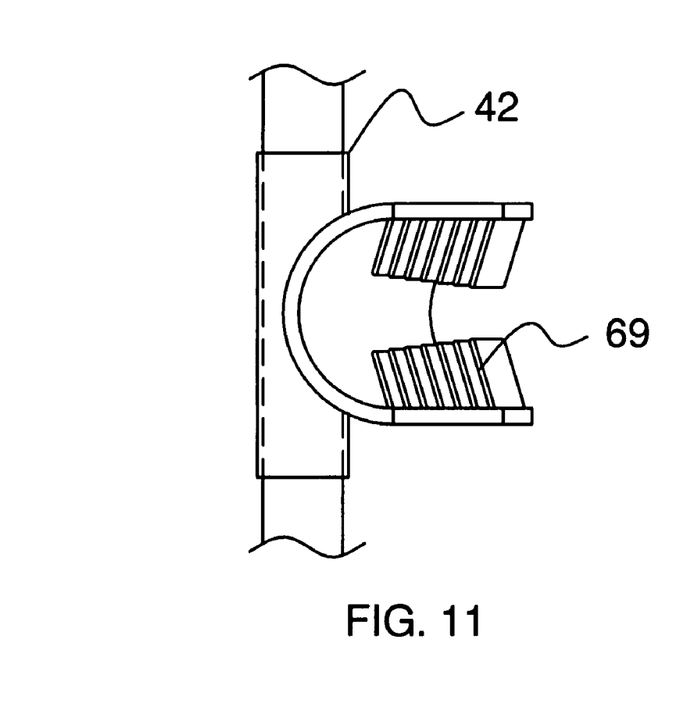
FIG. 11 is a top view of a second embodiment of the gun holder of the present invention.
Figure 12:
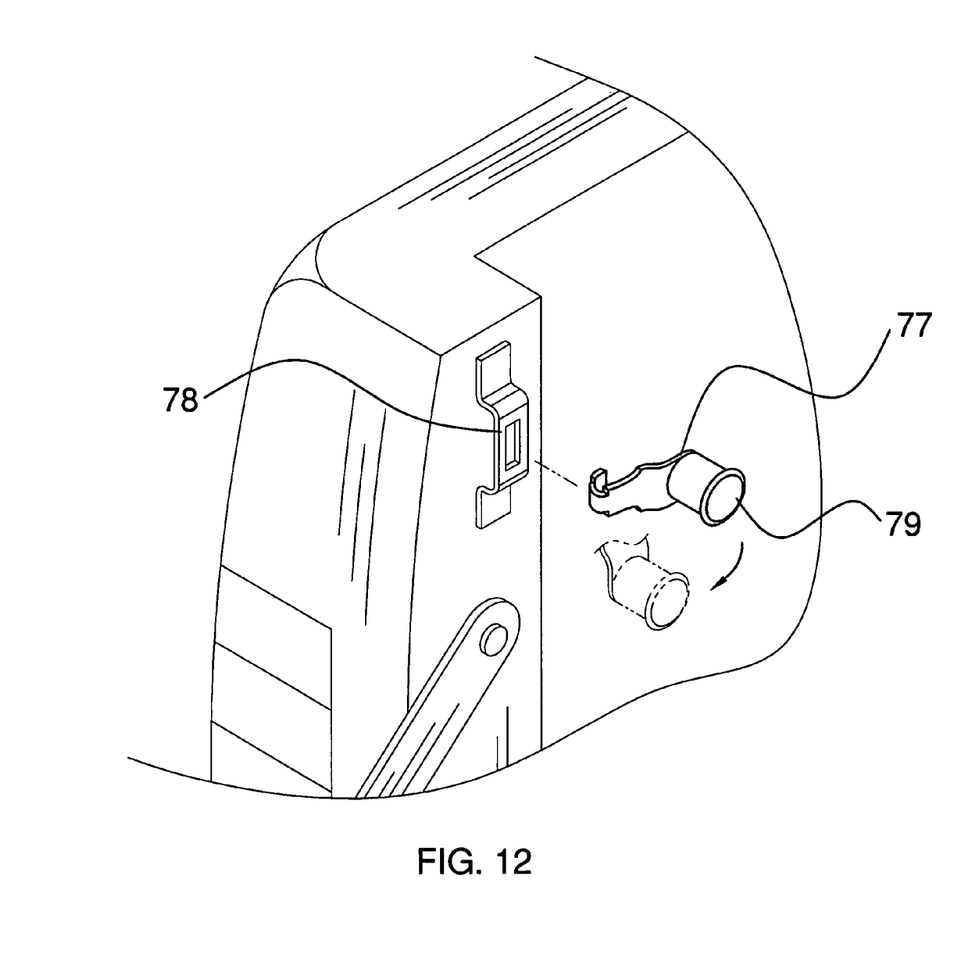
FIG. 12 is a perspective view of a pin attachment of the present invention.
Figure 13:
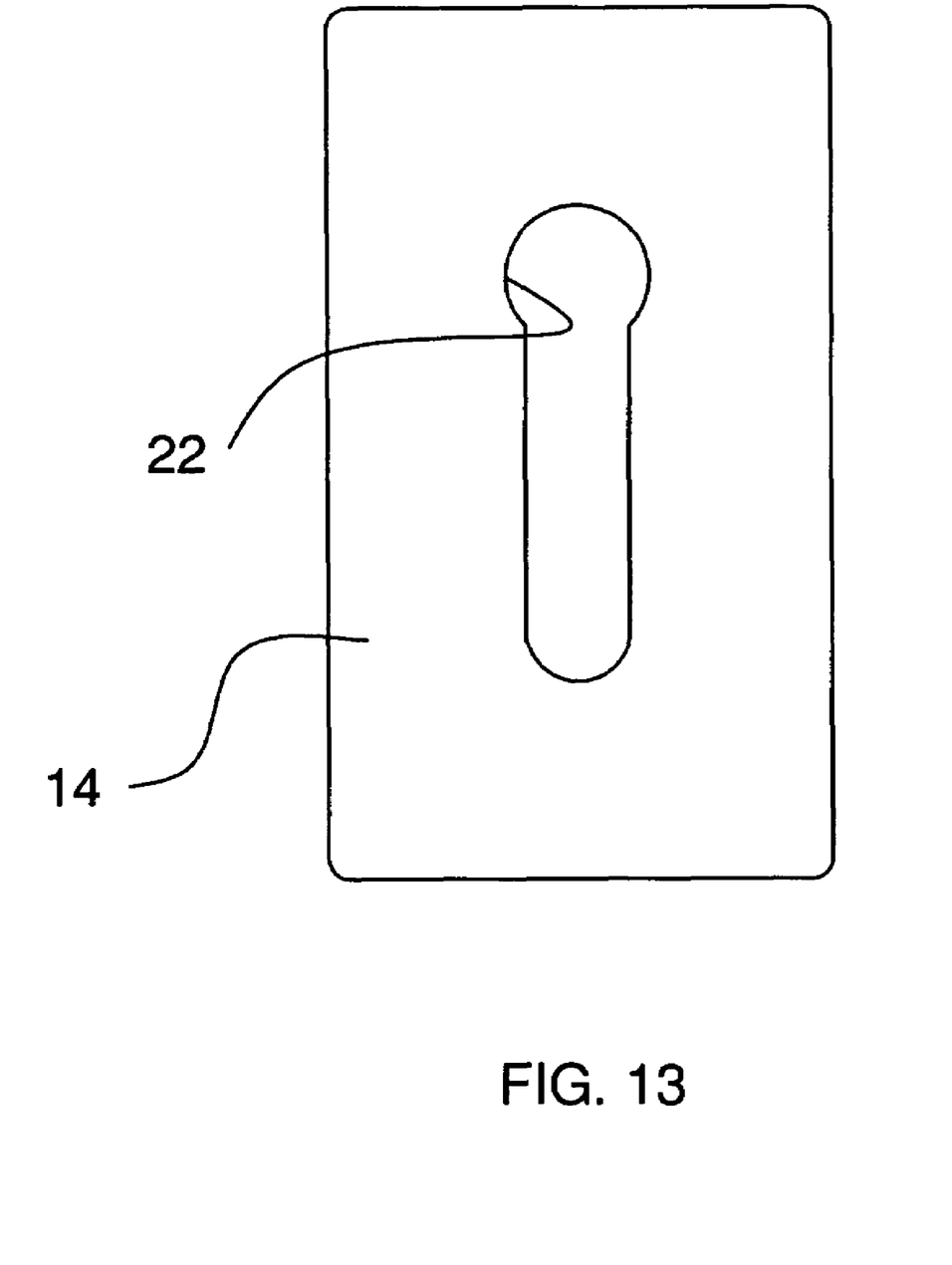
FIG. 13 is a side view of the present invention.

A can holder 54 one of the detachable holders 40 includes a cylinder 55 attached to a corresponding one of the brackets 42. The cylinder 55 has an open upper end 56 and closed lower end 57. The cylinder 55 may have openings therein for releasing condensation. A cup holder 58 one of the detachable holders 40 includes a plate 59 that is attached to and extends away from a corresponding one of the brackets 42. The plate 59 is horizontally orientated and has a circular opening 60 extending therethrough for receiving a cup. A fishing rod holder 61 one of the detachable holders 40 includes a tube 62 attached to one of the brackets 42. The tube 62 is angled upwardly away from the bracket 42. The tube 62 has a pair of open ends 63. A gun holder 64 one of the detachable holders 40 includes a saddle 65 having a pair of legs 66 attached together by an arcuate central member 67. The saddle 65 is attached to and angled downwardly away from one of the brackets 42. A securing member 68 is positioned on the legs 66 for releasably securing a gun to the saddle 65. The securing member 68 may include tether extendable over the saddle 65 or a plurality of resiliently flexible panels 69 attached to an inner surface of the legs 66 as shown in FIG. 11.

A covering 70 includes a pair of rods 71 each having the same shape as the wells 38. A flexible panel 72 is attached to and extends between the rods 71. Each of a pair of posts 73 has a top end 74 and a bottom end 75. Each of the top ends 74 is attached to one of the rods 71. The posts 73 are orientated substantially perpendicular to an attached one of the rods 71. Each of the bottom ends 75 is removably extendable into one of the wells 38. This allows the panel 72 to be used as a cover.

In use, the locking members 24 are positioned in the slots 22 so that the elongated member 12 extends between the side walls 26 of a pickup bed. The telescoping nature of the elongated member 12 allows for variances in pickup bed size. A coupler 77 may be removably attached to locking members 78 of pickup trucks that do not use locking pins. The coupler 77 includes a pin 79 that is attached to the locking member 78 and the pin is insertable into the slots 22.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, if is not desired to limit the invention to the exact construction and operation shown and described, and accordingly, all suitable modifications and equivalents may be resorted to, falling within the scope of the invention.

We claim:
1. A seatback and accessory system for a pickup truck bed, said system comprising:
   an elongated member having a first end and a second end, each of said first and second ends having a slot extending therein, each of said slots being configured to releasably receive one of a pair of locking members attached to opposite side walls of a pickup bed, said elongated member having a generally rectangular shared cross-section taken perpendicular to a longitudinal axis of said elongated member, said elongated member having an upper edge, a lower edge, a front side and a back side, said upper edge having a pair of wells extending therein, said wells being spaced from each other;
   a covering including a pair of rods, a flexible panel being attached to and extending between said rods, a pair of posts each having a top end and a bottom end, each of said top ends being attached to one of said rods, said posts being orientated substantially perpendicular to an attached one of said rods, each of said bottom ends being removably extendable into one of said wells; and
   wherein said locking members are positioned in said slots such that said elongated member extends between the side walls of a pickup bed.

2. The system according to claim 1, further including a plurality of detachable holders, each of said detachable holders being releasably attachable to said elongated member and being configured to releasably secure a selected item to the elongated member.

3. The system according to claim 1, wherein said elongated member is telescoping and includes a first portion being removably extendable into a second portion, said first portion including said first end and said second portion including said second end.

4. The system according to claim 2, wherein each of said detachable holders includes a bracket being removably positionable on said elongated member.

5. The system according to claim 4, wherein each of said brackets including a U-shaped member having a pair of free ends, each of said free ends having a flange attached thereto, said flanges on each of said brackets generally extending toward each other, said brackets being positioned on said elongated member such that a central member of said bracket is positioned adjacent to said front side and arms of said brackets extend across one of said top and lower edges.

6. The system according to claim 5, further including a plurality of grips, each of said grips being attached to one of said flanges.

7. The system according to claim 6, wherein each of said brackets is comprised of a resiliently elastic material.

8. The system according to claim 4, wherein a can holder of said detachable holders includes a cylinder attached to a corresponding one of said brackets, said cylinder having an open upper end and closed lower end.

9. The system according to claim 4, wherein a cup holder of said detachable holders includes a plate being attached to and extending away from a corresponding one of said brackets, said plate being horizontally orientated and having a circular opening extending therethrough.

10. The system according to claim 4, wherein a fishing rod holder of said detachable holders includes a tube attached to said bracket, said tube being angled upwardly away from said bracket, said tube having a pair of open ends.

11. The system according to claim 4, wherein a gun holder of said detachable holders includes a saddle having a pair of legs attached together by an arcuate central member, said saddle being attached to and angled downwardly away from one of said brackets.

12. The system according to claim 11, further including a securing member being positioned on said legs for releasably securing a gun to said saddle.

13. A seatback and accessory system for a pickup truck bed, said system comprising:
- an elongated member having a first end and a second end, said elongated member being telescoping and including a first portion being removably extendable into a second portion, said first portion including said first end and said second portion including said second end, each of said first and second ends having a slot extending therein, each of said slots being configured to releasably receive one of a pair of locking members attached to opposite side walls of a pickup bed, said elongated member having a generally rectangular shaped cross-section taken perpendicular to a longitudinal axis of said elongated member, said elongated member having an upper edge, a lower edge, a front side and a back side, said upper edge having a pair of wells extending therein, said wells being spaced from each other, a first of said wells being positioned in said first portion and being located adjacent to said first end, a second of said wells being positioned in said second portion and being located adjacent to said second end;
- a plurality of detachable holders, each of said detachable holders being releasably attachable to said elongated member and being configured to releasably secure a selected item to the elongated member, each of said detachable holders including a bracket being removably positionable on said elongated member, each of said brackets including a U-shaped member having a pair of free ends, each of said free ends having a flange attached thereto, said flanges on each of said brackets generally extending toward each other, said brackets being positioned on said elongated member such that a central member of said bracket is positioned adjacent to said front side and arms of said brackets extend across one of said top and lower edges, a plurality of grips, each of said grips being attached to one of said flanges, each of said brackets being comprised of a resiliently elastic material, a can holder of said detachable holders including a cylinder attached to a corresponding one of said brackets, said cylinder having an open upper end and closed lower end, a cup holder of said detachable holders including a plate being attached to and extending away from a corresponding one of said brackets, said plate being horizontally orientated and having a circular opening extending therethrough, a fishing rod holder of said detachable holders including a tube attached to said bracket, said tube being angled upwardly away from said bracket, said tube having a pair of open ends, a gun holder of said detachable holders including a saddle having a pair of legs attached together by an arcuate central member, said saddle being attached to and angled downwardly away from one of said brackets, a securing member being positioned on said legs for releasably securing a gun to said saddle;
- a covering including a pair of rods, a flexible panel being attached to and extending between said rods, a pair of posts each having a top end and a bottom end, each of said top ends being attached to one of said rods, said posts being orientated substantially perpendicular to an attached one of said rods, each of said bottom ends being removably extendable into one of said wells; and
- wherein said locking members are positioned in said slots such that said elongated member extends between the side walls of a pickup bed.

14. A seatback and accessory system for a pickup truck bed, said system comprising:
- an elongated member having a first end and a second end, each of said first and second ends having a slot extending therein, each of said slots being configured to releasably receive one of a pair of locking members attached to opposite side walls of a pickup bed, said elongated member having a generally rectangular shaped cross-section taken perpendicular to a longitudinal axis of said elongated member, said elongated member having an upper edge, a lower edge, a front side and a back side, said upper edge having a pair of wells extending therein, said wells being spaced from each other;
- a plurality of detachable holders, each of said detachable holders being releasably attachable to said elongated member and being configured to releasably secure a selected item to the elongated member, each of said detachable holders includes a bracket being removably positionable on said elongated member, a gun holder of said detachable holders includes a saddle having a pair of legs attached together by an arcuate central member, said saddle being attached to and angled downwardly away from one of said brackets; and
- wherein said locking members are positioned in said slots such that said elongated member extends between the side walls of a pickup bed.

15. The system according to claim 14, wherein said elongated member is telescoping and includes a first portion being removably extendable into a second portion, said first portion including said first end and said second portion including said second end, a first of said wells being positioned in said first portion and being located adjacent to said first end, a second of said wells being positioned in said second portion and being located adjacent to said second end.

16. The system according to claim 15, wherein each of said brackets including a U-shaped member having a pair of free ends, each of said free ends having a flange attached thereto, said flanges on each of said brackets generally extending toward each other, said bracken being positioned on said elongated member such that a central member of said bracket is positioned adjacent to said front side and arms of said brackets extend across one of said top and lower edges.

17. The system according to claim 15, wherein a can holder of said detachable holders includes a cylinder attached to a corresponding one of said brackets, said cylinder having an open upper end and closed lower end.

18. The system according to claim 15, wherein a cup holder of said detachable holders includes a plate being attached to and extending away from a corresponding one of said brackets, said plate being horizontally orientated and having a circular opening extending therethrough.

19. The system according to claim 15, wherein a fishing rod holder of said detachable holders includes a tube attached to said bracket, said tube being angled upwardly away from said bracket, said tube having a pair of open ends.

20. The system according to claim 15, further including a securing member being positioned on said legs for releasably securing a gun to said saddle.

* * * * *